United States Patent
Berkcan et al.

(10) Patent No.: US 6,892,115 B2
(45) Date of Patent: May 10, 2005

(54) METHOD AND APPARATUS FOR OPTIMIZED CENTRALIZED CRITICAL CONTROL ARCHITECTURE FOR SWITCHGEAR AND POWER EQUIPMENT

(75) Inventors: Ertugrul Berkcan, Clifton Park, NY (US); Daniel White Sexton, Niskayuna, NY (US); Scott Charles Evans, Burnt Hills, NY (US); Marc Robert Pearlman, Clifton Park, NY (US); Emad Andarawis Andarawis, Ballston Lake, NY (US); Austars Raymond Schnore, Jr., Scotia, NY (US); Charles Scott Sealing, Clifton Park, NY (US); William James Premerlani, Scotia, NY (US); Changting Wang, Schenectady, NY (US); Terry Michael Topka, Scotia, NY (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 10/373,676

(22) Filed: Feb. 25, 2003

(65) Prior Publication Data

US 2004/0024475 A1 Feb. 5, 2004

Related U.S. Application Data (60) Provisional application No. 60/359,544, filed on Feb. 25, 2002, and provisional application No. 60/438,159, filed on Jan. 6, 2003.

(51) Int. Cl.$^7$ .................... G05D 11/00; G05D 17/00; G05D 3/12; G05D 5/00; G05D 9/00
(52) U.S. Cl. .................... 700/286; 700/22; 700/291; 700/292; 700/295; 361/3; 361/72; 361/60; 340/3.1; 340/3.4; 340/825.69; 307/38; 307/39
(58) Field of Search .................... 700/22, 286, 287, 700/291, 292, 295; 702/64, 58; 340/825.69, 3.1, 3.4; 307/38, 39; 361/72, 3, 60

(56) References Cited

U.S. PATENT DOCUMENTS

| 3,772,505 A | 11/1973 | Massell |
| 3,938,007 A | 2/1976 | Boniger et al. |
| 3,956,671 A | 5/1976 | Nimmersjo |

(Continued)

FOREIGN PATENT DOCUMENTS

| EP | 0718948 A2 | 6/1996 | .......... H02H/3/093 |
| EP | 0723325 A1 | 7/1996 | ............ H02H/7/26 |
| EP | 0949734 A2 | 10/1999 | .......... H02H/3/093 |

OTHER PUBLICATIONS

Atanackovic D. et al. An Integrated Knowledge–Based Model For Power–System Planning IEEE Expert, IEEE Inc. New York, Jul. 1997; pp. 65–71.

*Primary Examiner*—Ramesh Patel
(74) *Attorney, Agent, or Firm*—Ohlandt, Greeley, Ruggiero & Perle (57) ABSTRACT

A method of monitoring and controlling a power distribution system is provided. The power distribution system includes a plurality of circuit breakers, a plurality of node electronic units, and wherein each associated circuit breaker is electrically coupled with each respective node electronic unit. The system also includes at least one digital network, and at least one central control processing unit (CCPU) wherein each CCPU includes a first power system global information set, and each CCPU is communicatively coupled to the plurality of node electronic units. The method includes transmitting at least one digital message from each node electronic unit to each CCPU over a respective network, determining an operational state of the power distribution system from the digital message, and transmitting at least one multicast message from each CCPU to each node electronic unit such that the circuit breakers are operable from each CCPU.

37 Claims, 7 Drawing Sheets

U.S. PATENT DOCUMENTS

| | | |
|---|---|---|
| 3,963,964 A | 6/1976 | Mustaphi |
| 4,001,742 A | 1/1977 | Jencks et al. |
| 4,245,318 A | 1/1981 | Eckart et al. |
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,349,644 A * | 9/1994 | Massey et al. ................ 706/10 |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A * | 12/1997 | Ehlers et al. ................ 700/286 |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,924,486 A * | 7/1999 | Ehlers et al. ................ 165/238 |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |

| | | |
|---|---|---|
| 6,005,757 A | 12/1999 | Shvach et al. |
| 6,005,758 A | 12/1999 | Spencer et al. |
| 6,018,451 A | 1/2000 | Lyke et al. |
| 6,038,516 A * | 3/2000 | Alexander et al. ............ 702/67 |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 | 2/2001 | Spencer et al. |
| 6,198,402 B1 | 3/2001 | Hasegawa et al. |
| 6,212,049 B1 | 4/2001 | Spencer et al. |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | DiSalvo et al. |
| 6,289,267 B1 * | 9/2001 | Alexander et al. .......... 700/286 |
| 6,291,911 B1 | 9/2001 | Dunk et al. |
| 6,292,340 B1 | 9/2001 | O'Regan et al. |
| 6,292,717 B1 * | 9/2001 | Alexander et al. .......... 700/293 |
| 6,292,901 B1 | 9/2001 | Lys et al. |
| 6,297,939 B1 | 10/2001 | Bilac et al. |
| 6,313,975 B1 | 11/2001 | Dunne et al. |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Andersen |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu, et al. |

* cited by examiner

METHOD AND APPARATUS FOR OPTIMIZED CENTRALIZED CRITICAL CONTROL ARCHITECTURE FOR SWITCHGEAR AND POWER EQUIPMENT

CROSS REFERENCE TO RELATED APPLICATIONS

This application is related to U.S. Patent Application No. 60/359,544 filed on Feb. 25, 2002 for "Integrated Protection, Monitoring, and Control" the content of which is incorporated in its entirety herein by reference. This application is also related to U.S. Patent Application No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for protecting, monitoring, and controlling the electrical switchgear.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear, which facilitates dividing the power into branch circuits, which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

In some known switchgear control and protection systems, all relaying monitoring, control and protection functions are performed locally within a trip unit in a switchgear circuit breaker. This arrangement is implemented with a plurality of point-to-point wiring and dedicated equipment and provides for tight latency between monitored parameters and protective functions based on those parameters. A centralized control architecture will need to at least duplicate the latencies of the present systems to provide similar fault clearing protective features.

BRIEF DESCRIPTION OF THE INVENTION

In one aspect, a method of monitoring and controlling a power distribution system is provided wherein the power distribution system includes a plurality of circuit breakers, a plurality of node electronic units wherein each node electronic unit is mounted remotely from an associated circuit breaker, such that, each associated circuit breaker is electrically coupled with each respective node electronic unit, at least one digital network, and at least one central control processing unit (CCPU) wherein each CCPU includes a first power system global information set, and is communicatively coupled through a respective one of the at least one network to the plurality of node electronic units. The method includes transmitting at least one digital message from each node electronic unit to each CCPU over a respective network, determining an operational state of the power distribution system from the unicast message, and transmitting at least one multicast message from each CCPU to each node electronic unit such that the circuit breakers are operable from each CCPU.

In another aspect, a centralized power distribution system is provided. The system includes at least one digital network communicatively coupled to at least one central control processing unit (CCPU), wherein a number of the at least one digital network is equal to a number of at least one CCPU, the at least one CCPU and at least one digital network configured as redundant networks, and a plurality of node electronic units wherein each node electronic unit is communicatively coupled to each redundant network, and each node electronics unit is coupled to an associated circuit breaker wherein each node electronics unit is configured to receive signals from the associated circuit breaker, and transmit signals to the associated circuit breaker.

DETAILED DESCRIPTION OF THE INVENTION

As used herein, an element or step recited in the singular and preceded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Figure 1:
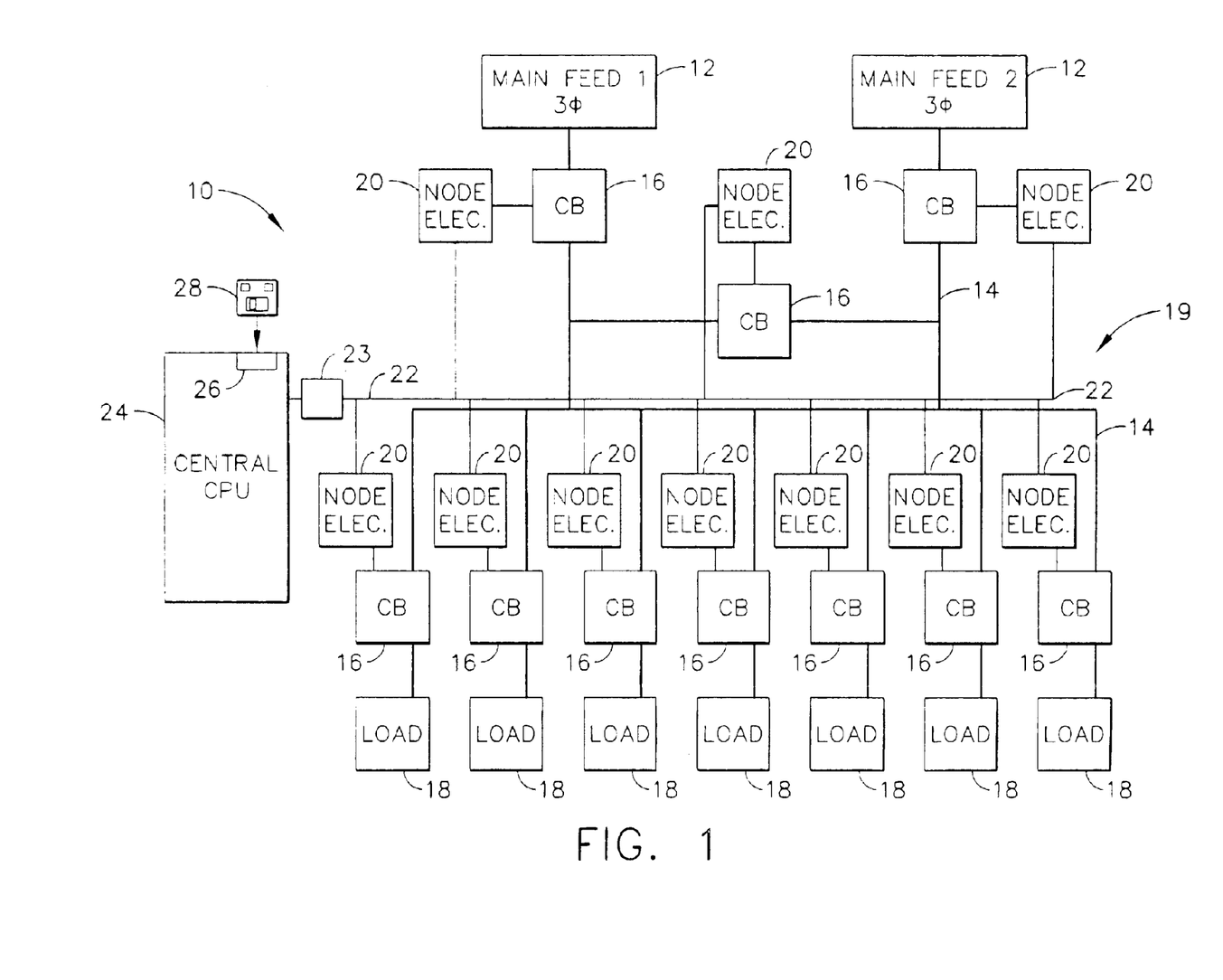
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
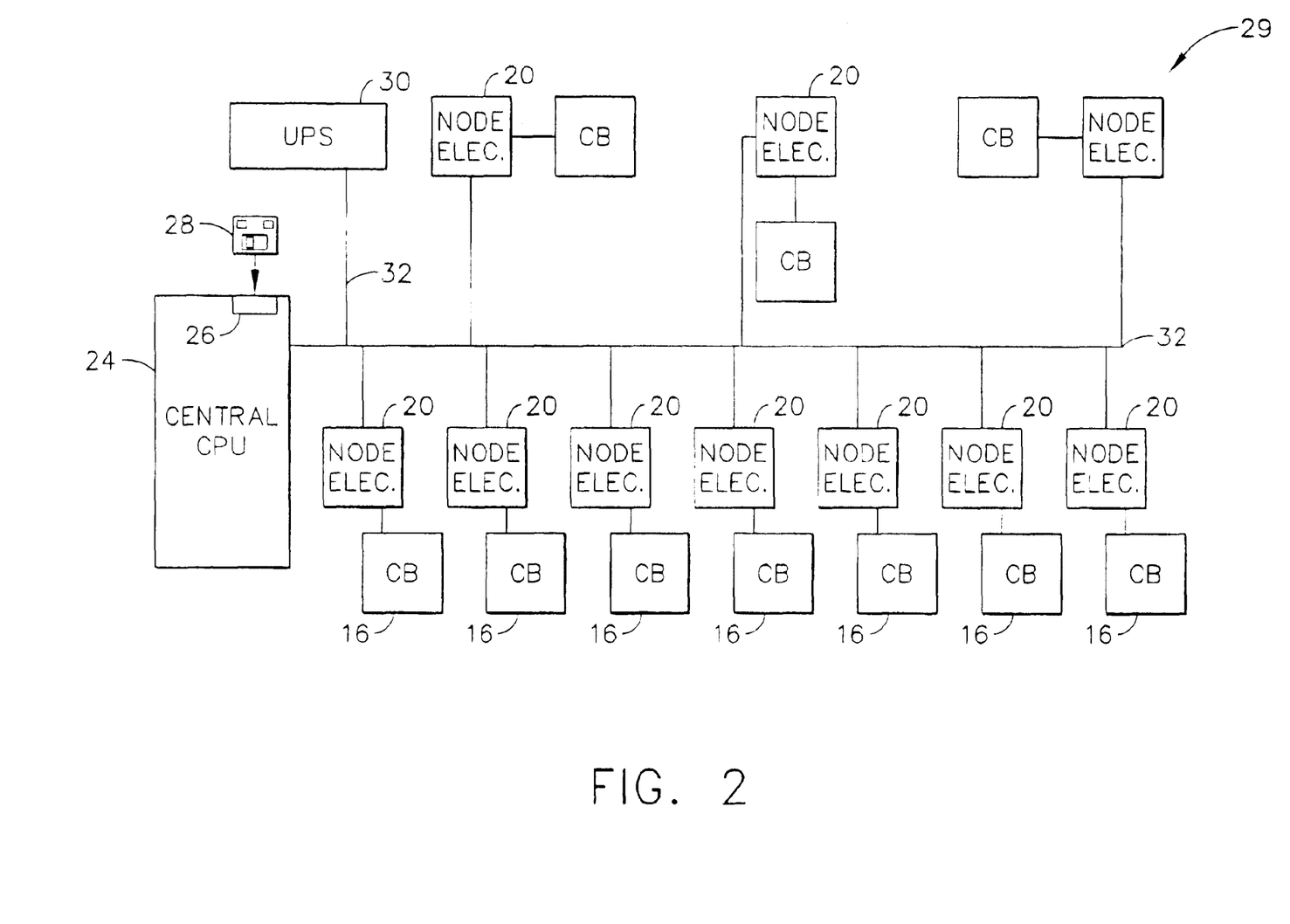
FIG. 2 is an exemplary schematic illustration of a node electronics unit power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
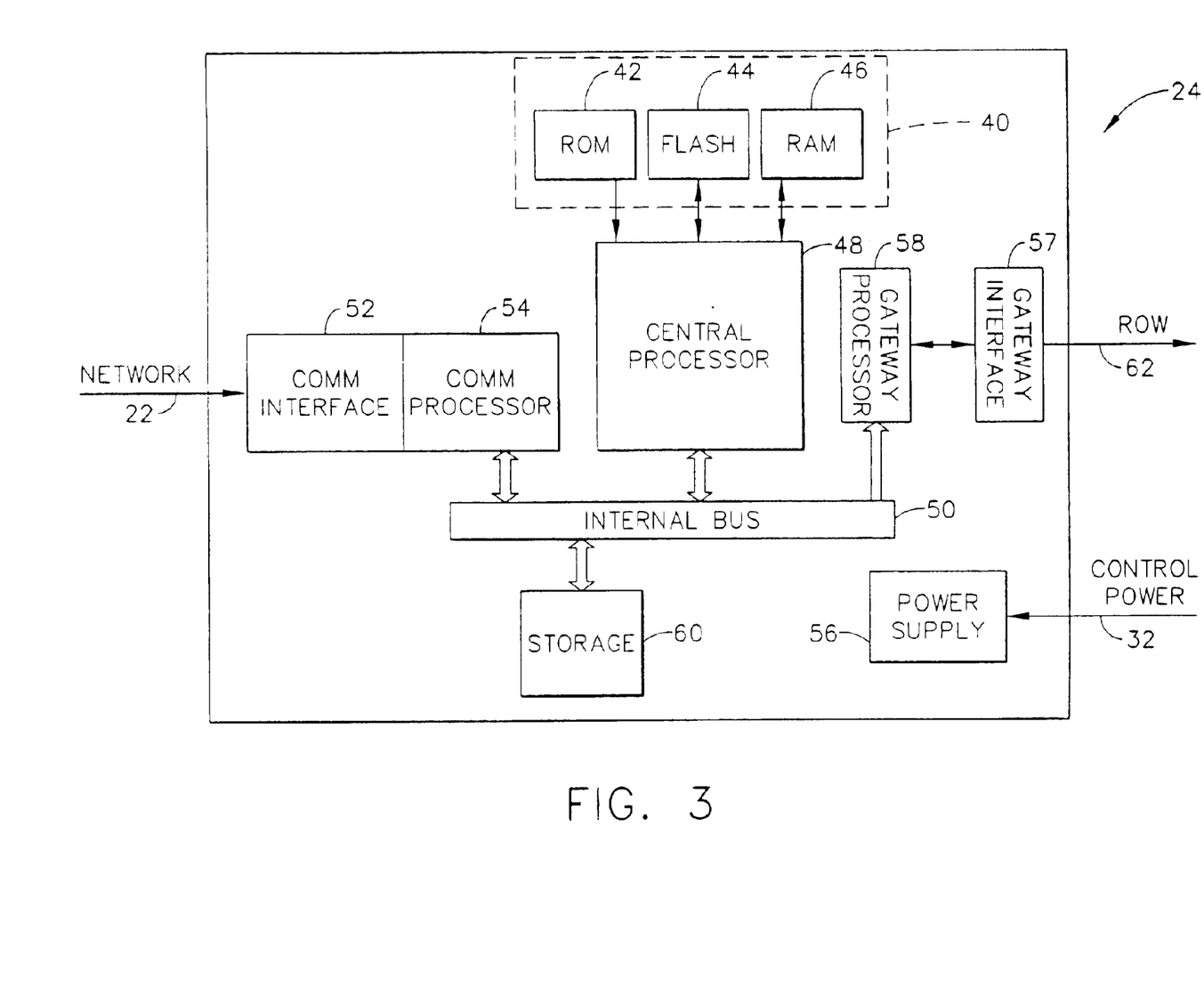
FIG. 3 is an exemplary schematic illustration of a central control processing unit (CCPU) that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronics unit 20 via CCPU 24 and digital network 22. In another embodiment, information sent from node electronics unit 20 is received at communication interface 52 and transmitted to Internet 62 via gateway interface 57.

Figure 4:
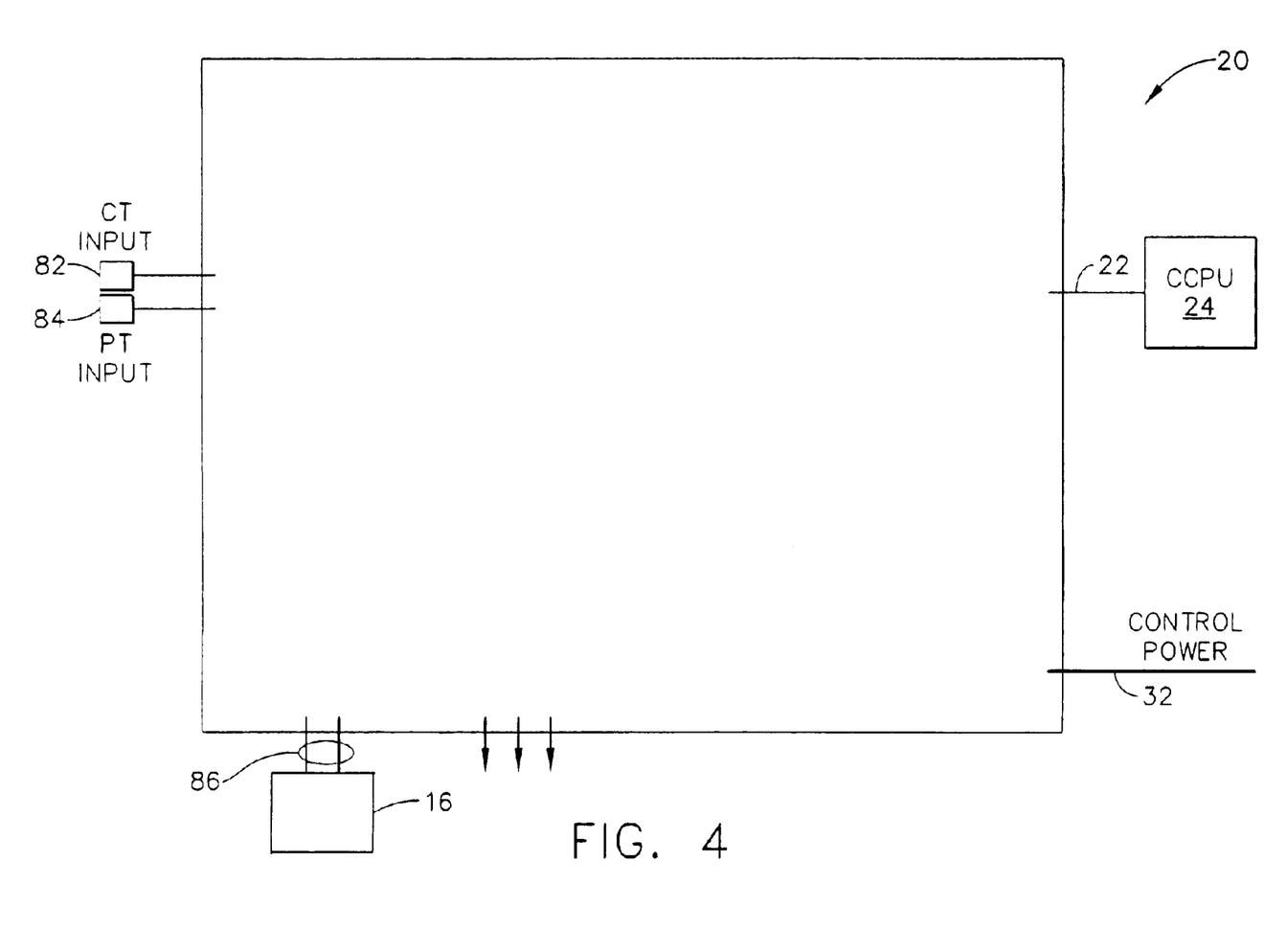
FIG. 4 is an exemplary schematic illustration of a node electronic unit that may used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals input from a plurality of devices, such as, but not limited to, a current sensor 82, a voltage sensor 84, and/or circuit breaker 16. Status signals from circuit breaker 16 can include signals related to one or more conditions of the breaker, such as, but not limited to, an auxiliary switch status, and a spring charge switch status. Additionally, node electronics unit 20 sends signals to at least circuit breaker 16 in order to control one or more states of the breaker.

In use, signals are transmitted to CCPU 24 via node electronics unit 20, and digital network 22. Node electronics unit 20 receives the signals and packages a digital message that includes the signals and additional data relating to a health and status of node electronics unit 20. The health and status data may include information based on problems found by internal diagnostic routines and a status of self checking routines that run locally in node electronics unit 20. CCPU 24 processes digital message using one or more protection algorithms, monitoring algorithms, and any combination thereof. In response to the processing of digital message, CCPU 24 sends digital message back to node electronics unit 20 via digital network 22. In the exemplary embodiment, node electronics unit 20 actuates circuit breaker 16 via signal in response to digital message received from CCPU 24. In one embodiment, circuit breaker 16 is actuated in response to commands sent only by CCPU 24, i.e., circuit breaker 16 is not controlled locally by node electronics unit 20, but rather is operated remotely from CCPU 24 based on digital message received from node electronics unit 20 over network 22.

Figure 5:
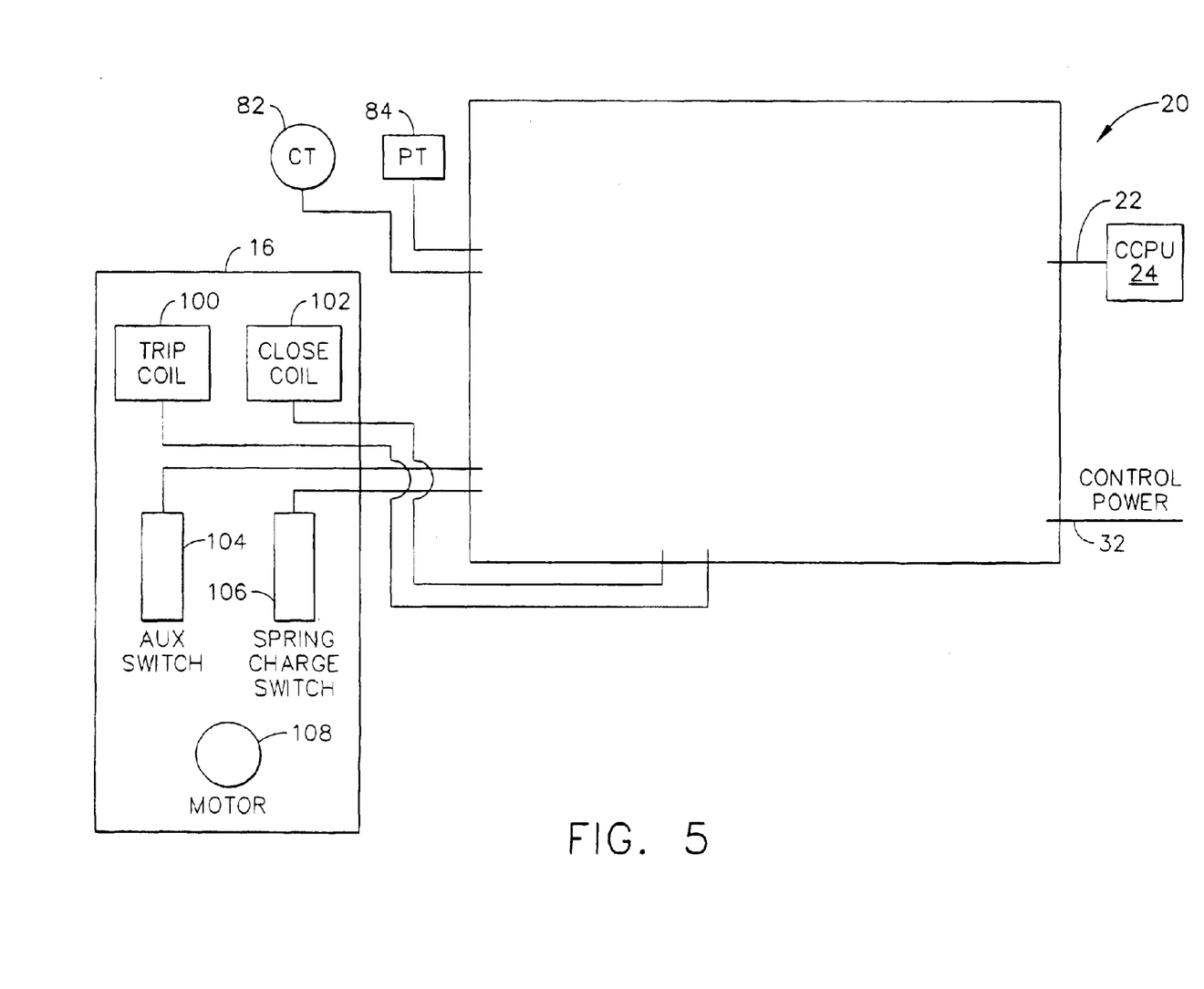
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 includes only a trip coil 100, a close coil 102, an auxiliary switch 104, a spring charge switch 106, and a motor 108. Circuit breaker 16 does not include a trip unit. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84.

Circuit breaker 16 is in electrical communication with node electronics unit 20 through a wiring harness, which may include copper wiring, communications conduits, and any combination thereof. Current sensor 82, and voltage sensor 84 are in electrical communication with node electronics unit 20 through a cable that may include copper wiring, communications conduits, and any combination thereof. In an exemplary embodiment, circuit breaker 16 is a unitary device mounted proximate to node electronics unit 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electro-mechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
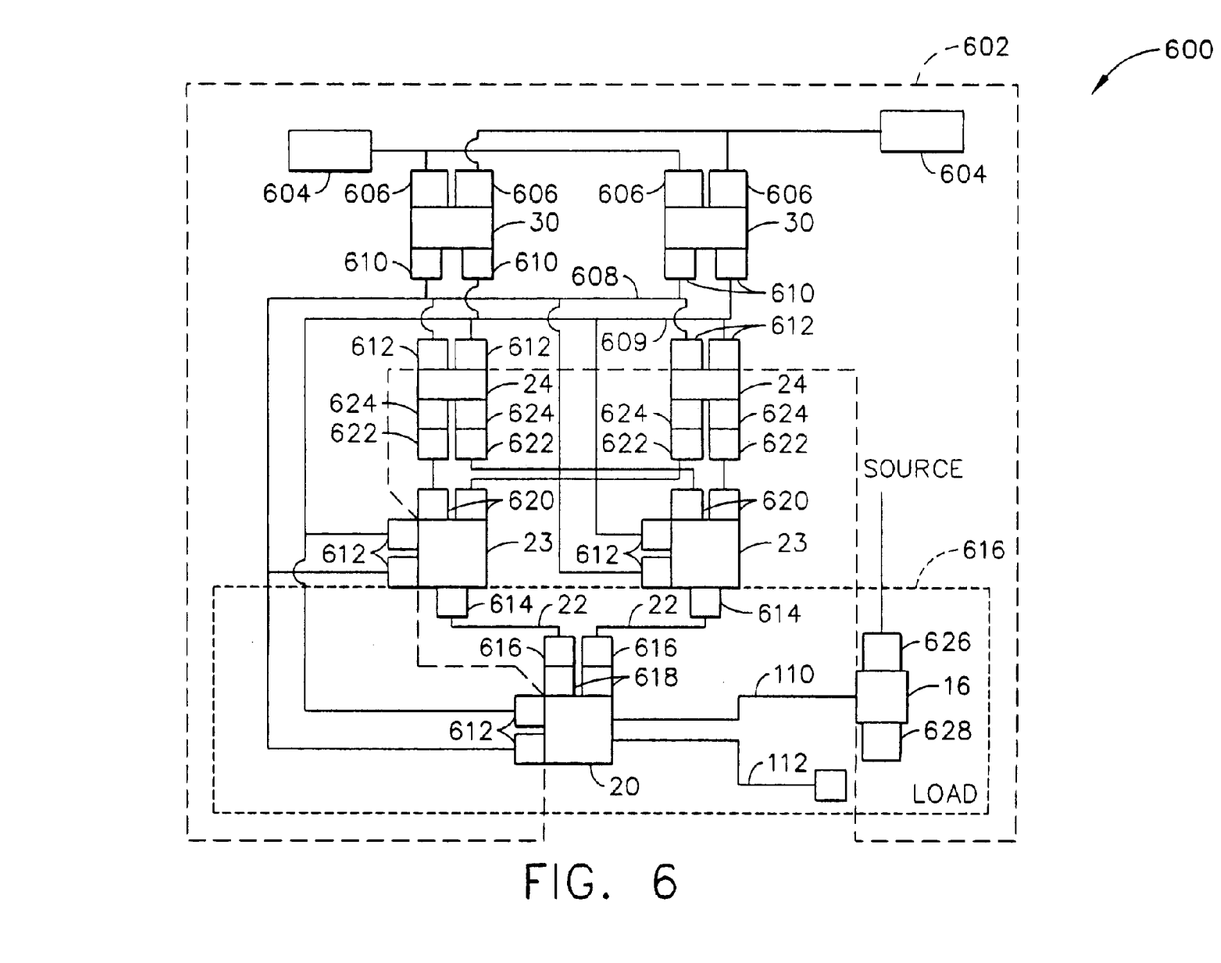
FIG. 6 is a block schematic of an exemplary optimized centralized control architecture that may be used with the power distribution system shown in FIG. 1.

FIG. 6 is a block schematic of an exemplary optimized centralized control architecture 600 that may be used with power distribution system 10 shown in FIG. 1. Components of optimized centralized control architecture 600 shown in FIG. 6 that are identical to components shown in FIGS. 1–5 are shown in FIG. 6 with the same reference numerals used in FIGS. 1–5. Optimized centralized control architecture 600 illustrates a power distribution system that is configured to optimize system reliability, availability and cost based on considerations that include hardware redundancy, software optimization, and system latency. Optimized centralized control architecture 600 is described as a doubly redundant power distribution system in an exemplary fashion. Optimized centralized control architecture 600 may include a configuration of components optimized for a different level of redundancy than the illustrated level of two.

Optimized centralized control architecture 600 includes a dual redundant main power subsystem 602 that includes two uninterruptible power supplies (UPS) configured to supply the control power needs of the control components of power distribution system 10. Each UPS 30 is electrically coupled to two of user's power sources 604 of a predetermined reliability and availability through a pair of power connections 606. Each UPS 30 supplies control power to two control power buses 608 and 609, respectively. Each UPS 30 includes two output power connections 610, one power connection 610 from each UPS 30 is electrically coupled to control power bus 608 and the other power connection 610 is electrically coupled to 609. In the exemplary embodiment, only one UPS 30 supplies each bus 608 and 609 at a time. In case of an error in one UPS 30, the other UPS 30 will sense the loss of control power on bus 608 or 609 and may respond by energizing the bus experiencing the loss of power. In one embodiment, if the loss of power on control power bus 608 or 609 is due to a fault on the bus, UPS 30 will sense the fault and will not attempt to energize the faulted bus 608 or 609. In an alternative embodiment, CCPU 24 may sense the fault, and command UPS 30 to not attempt to energize the faulted bus 608 or 609.

Buses 608 and 609 supply each control component of power distribution system 10 in a dual redundant manner. In the exemplary embodiment, buses 608 and 609 are cables that run proximate each other to all components in power distribution system 10. In an alternative embodiment, buses 608 and 609 may be run separately to facilitate preventing a common mode failure from disabling both control power buses 608 and 609. Each component in power distribution system 10 includes two input power connections 612 wherein one power connection 612 electrically couples to one of buses 608 and 609.

Optimized centralized control architecture 600 includes dual redundant network 22. Each network 22 communicatively couples to a network switch through a communication connection 614 and to a communication connection 616 on each node electronics unit 20. Only one node electronics unit 20 is illustrated in FIG. 6, components within box 616 may be duplicated to conform to a particular application. In the exemplary embodiment, each node electronics unit 20 includes two communications interfaces 618, each interface 618 is communicatively coupled to one of node electronics unit 20 communication connections 616.

Network switch 23 includes two input communication connections 620 each input each input communication connection 620 is communicatively coupled to an output communications connection 622 on each of CCPU 24. In the exemplary embodiment, each output communication connection 622 is coupled to a CCPU communication interface 624. In an alternative embodiment, each input communication connection 620 is communicatively coupled to only one switch 23, thus segregating each CCPU 24 to only one network. In another alternative embodiment, switches 23 are communicatively coupled, thus each switch 23 will appear as a node on each network associated with the other switch 23. Each embodiment, of the network configuration addresses particular concerns regarding reliability and availability associated with a particular power distribution system 10 application. As such one configuration may be selected over another based on a user's requirements, industry standards for the application and/or cost considerations.

Each node electronics unit 20 is coupled to a separately located circuit breaker 16 through a standard wiring harness 110 and coupled to multi-phase voltage sensor 82 and multi-phase current sensor 84 through cable 112. Circuit breaker 16 is operable to open and close a path of current flow from a (source) to a load (not shown) through power connections 626 and 628.

In operation, all node electronics units 20 receive input from only sensors associated with one circuit breaker 16. The received data is transmitted to each CCPU 24 through network 22 and switch 23. The broadcast message from node electronics unit 20 to CCPU 24 is a unicast message intended only for receipt by each CCPU 24. Network 22 and switch 23 are dual redundant components optimized to provide a predetermined reliability and availability goal. Each CCPU 24 receives all unicast messages from all node electronics units 20 operating on power distribution system 10. Having all system state information available in one location permits CCPU 24 to calculate commands and actions to be sent to all node electronics units 20 based on the global information set. this contrast with known power distribution systems where circuit breaker control actions are based on local parameters or a limited number of components hardwired to a separate relay or trip unit. The determined commands and actions for all node electronics units 20 are package into a multicast message and sent via high-speed network 22 and switches 23 to all node electronics units 20. Each node electronics unit 20 receives each CCPU 24 message and parses the portion of the message addressed to it, and implements the commands and actions sent from CCPU 24. Since each node electronics unit 20 receives two messages, one from each CCPU 24, there may be a conflict between the commands and actions sent from each CCPU 24. Each node electronics unit 20 is programmed to resolve potential conflicts between commands and actions sent from both CCPUs 24. In the exemplary embodiment, a voting conflict resolution algorithm is not used, but rather node electronics unit 20 selects the safer of the two commands and generates actuation commands it then sends to its associated circuit breaker 16. In the exemplary embodiment, power distribution system 10 control components are dual redundant and node electronics unit 20 and circuit breaker 16 components are singular. In an alternative embodiment, power distribution system 10 control components may be configured to a different level of redundancy to accommodate a specific application.

In the exemplary embodiment, each CCPU 24 is operating in a real-time environment wherein an operating system utilized by CCPU 24 is a real-time operating system such as Linux with RTLinux. Linux is a registered trademark of Linus Torvalds of Helsinki, Finland. RTLinux is a registered trademark of Finite State Machine Labs, Inc. of Socorro, N. Mex.

In the exemplary embodiment, each CCPU 24 is configured to synchronize its internal clock with respect to time to all other CCPUs internal clocks based on a determination of a relative difference in clock speed between it and each other CCPU 24. Each CCPU 24 determines the relative difference between its internal clock and the internal clocks of all other CCPUs 24 based on the messages transmitted to the node electronics units 20 and the messages received from node electronics units 20.

Figure 7:
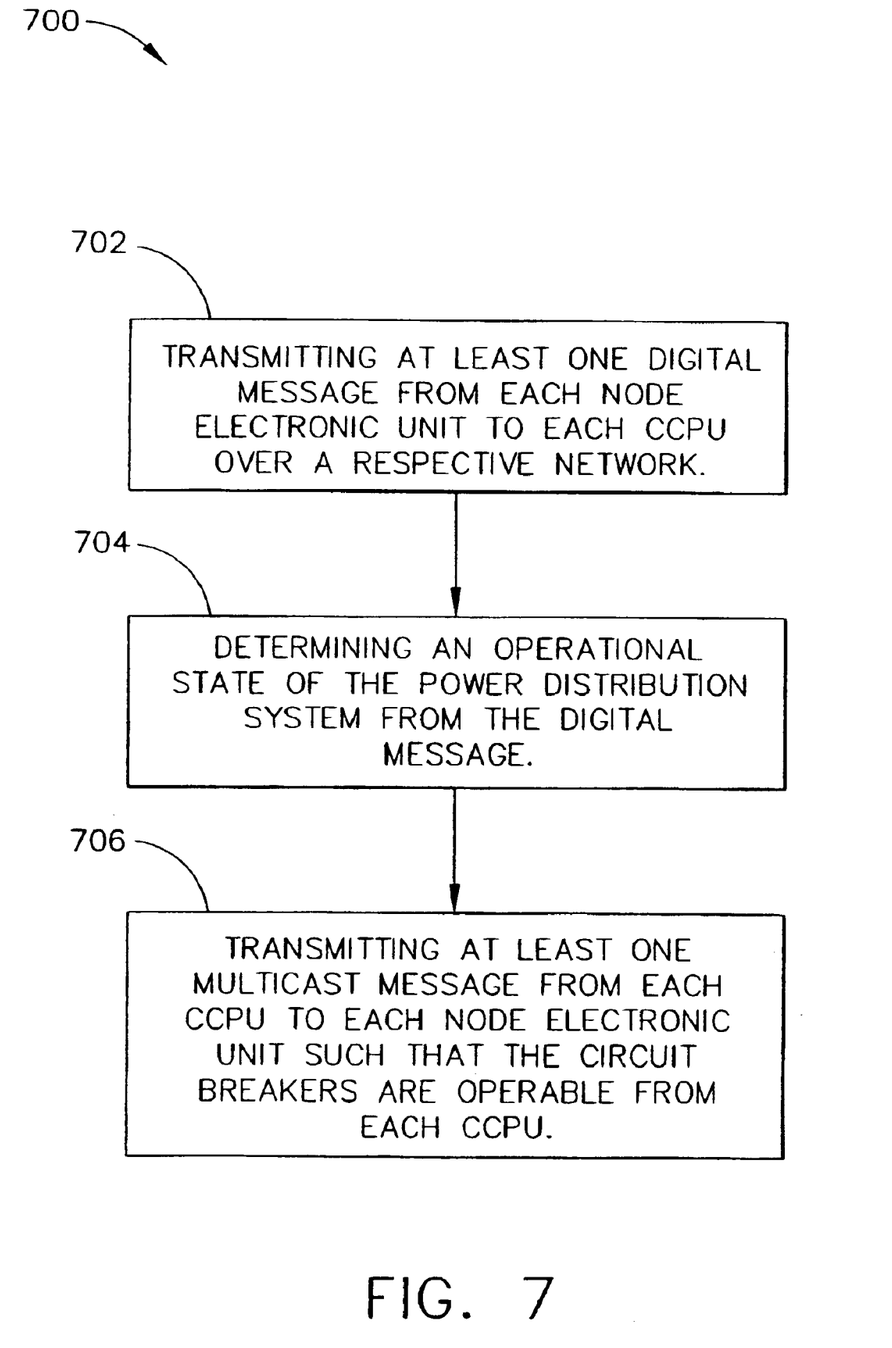
FIG. 7 is a flow diagram illustrating a method 700 for monitoring and controlling a power distribution system.

FIG. 7 is a flow diagram illustrating a method 700 for monitoring and controlling a power distribution system. In the exemplary embodiment, the power distribution system 10 includes a plurality of circuit breakers 16, a plurality of node electronic units 20, each node electronic unit 20 is mounted remotely from it's associated circuit breaker, each associated circuit breaker communicatively coupled with each respective node electronic unit 20. In the exemplary embodiment, each circuit breaker 16 is coupled to it's respective node electronics unit 20 via a standard wiring harness. In an alternative embodiment, each circuit breaker 16 is coupled to it's respective node electronics unit 20 via a data transmission medium, such as, but not limited to, network segment, a fiber conduit, and a wireless connection. The power distribution system 10 also includes at least one digital network 22, and at least one central control processing unit (CCPU) 24 wherein each CCPU 24 includes a first power system global information set, and each CCPU 24 is communicatively coupled through a respective one of the at least one network 22 to the plurality of node electronic units 20. Method 700 includes transmitting 702 at least one digital message from each node electronic unit 20 to each CCPU 24 over a respective network 22. In the exemplary embodiment each CCPU 24 then determines 704 an operational state of the power distribution system from the digital message by constructing a global information set that includes state data for all components operating on power distribution system 10 including current and voltage readings throughout power distribution system 10. Each CCPU 24 transmits 706 at least one multicast message to each node electronic unit 20 such that each circuit breaker 16 is operable from each CCPU 24.

The above-described centralized control architecture system is cost-effective and highly reliable. Each system includes at least one central control processor unit (CCPU) and networked devices to facilitate protecting a set of switchgear. The networked devices proximate each circuit breaker monitor voltage and current signals from sensors also located proximate each circuit breaker. The CCPU receives all monitored signals from all devices over the high-speed network. The CCPU implements protection and optimization algorithms for each circuit breaker node electronics unit based on global voltage and current signals. This method offers performance advantages over existing local, non-networked protection. In many overcurrent faults, the fault level may appear at multiple levels in the electrical protection hierarchy. Branch, feeder and main circuit breakers may all "see" the fault. Protection engineers can partially avoid the problem by setting longer delays. This results in faults at high levels in the hierarchy causing more damage and still can result in multiple devices interrupting, removing electrical service from circuits that do not have a fault. Accordingly, the power distribution system facilitates protection and optimization of power system operation in a cost-effective and reliable manner.

Exemplary embodiments of power distribution system components are described above in detail. The components are not limited to the specific embodiments described herein, but rather, components of each system may be utilized independently and separately from other components described herein. Each power distribution system component can also be used in combination with other power distribution system components.

While the invention has been described in terms of various specific embodiments, those skilled in the art will recognize that the invention can be practiced with modification within the spirit and scope of the claims.

What is claimed is:

1. A method of monitoring and controlling a power distribution system, said method comprising:
    transmitting at least one first message from a plurality of node electronic units to a processor over a network, said first message being indicative of a power condition in the power distribution system and/or a condition of a circuit breaker in communication with each of said plurality of node electronic units;
    determining an operational state of the power distribution system from said first message; and
    transmitting at least one second message from said processor to each of said plurality of node electronics unit such that said circuit breakers are operable by said processor.

2. A method in accordance with claim 1 wherein transmitting said at least one first message comprises transmitting at least one digital unicast message from each of said plurality of node electronic units to said processor.

3. A method in accordance with claim 1 wherein said network uses a Fast Ethernet protocol.

4. A method in accordance with claim 3 wherein said network is upgradeable based on future revisions to IEEE 802.3(u) and its successors.

5. A method in accordance with claim 1 wherein said network operates at a data transmission speed of at about 100 Mbps.

6. A method in accordance with claim 1 wherein said network operates at a data transmission speed of about 1 Gbps.

7. A method in accordance with claim 1 wherein said network has a star topology.

8. A method in accordance with claim 1 wherein said operational state is determined in said processor in real-time.

9. A method in accordance with claim 8 wherein said processor has a real-time operating system.

10. A method in accordance with claim 1 wherein said second message is a multicast message from said processor to all of said plurality of node electronics units.

11. A method in accordance with claim 1 wherein said network is more than one digital communication network.

12. A method in accordance with claim 11 wherein said processor is more than one processor.

13. A method in accordance with claim 12 wherein said first message is transmitted over each of said more than one network.

14. A method in accordance with claim 13 further comprising communicatively coupling each of said more than one processor to each of said more than one network such that each processor is able to communicate through each network.

15. A method in accordance with claim 12 further comprising synchronizing said more than one processor with respect to time so that each process is able to determine a relative difference in clock speed therebetween.

16. A method in accordance with claim 1 further comprising synchronizing said plurality of node electronic units so that said first message from each node electronics unit represents a synchronized condition of the power distribution system.

17. A centralized power distribution system comprising:
    at least one digital network communicatively coupled to at least one central control processing unit (CCPU), wherein a number of said at least one digital network is equal to a number of said at least one CCPU, said at least one CCPU and said at least one digital network configured as redundant networks; and a plurality of node electronic units, each said node electronic unit communicatively coupled to each said redundant network, and each said node electronics unit coupled to an associated circuit breaker, each said node electronics unit configured to receive signals from said associated circuit breaker, and transmit signals to said associated circuit breaker.

18. A centralized power distribution system in accordance with claim 17 wherein each said at least one CCPU is configured to:

receive digital signals from all said plurality of node electronic units over said at least one network;

determine an operational state of said power distribution system from said digital signals; and transmit a multicast message to all said plurality of node electronic units such that said circuit breakers are operable from each said CCPU.

19. A centralized power distribution system in accordance with claim 17 wherein each said node electronics unit is configured to transmit at least one digital unicast message over the network using Fast Ethernet protocol.

20. A centralized power distribution system in accordance with claim 17 wherein said network is upgradeable based on future revisions to IEEE 802.3(u) and its successors.

21. A centralized power distribution system in accordance with claim 17 wherein each of said at least one digital network is capable of operating at about 100 Mbps.

22. A centralized power distribution system in accordance with claim 17 wherein each of said at least one digital network is capable of operating at about 1 Gbps.

23. A centralized power distribution system in accordance with claim 17 wherein each of said at least one digital network is configured in a star topology.

24. A centralized power distribution system in accordance with claim 17 wherein each of said at least one CCPU is configured to use a real-time operating system.

25. A centralized power distribution system in accordance with claim 17 wherein each of said at least one CCPU is configured to determine an operational state of said power distribution system based on said node electronics unit messages received from all node electronics units.

26. A centralized power distribution system in accordance with claim 17 wherein each of said at least one node electronics unit is coupled to each circuit breaker in a one-to-one correspondence.

27. A centralized power distribution system in accordance with claim 17 wherein each of said at least one CCPU is configured to broadcast at least one multicast message from each CCPU to all node electronics units over said network.

28. A centralized power distribution system in accordance with claim 17 wherein each network comprises:

at least one digital communication network;

at least one CCPU that includes at least one network communication interface wherein each interface is communicatively coupled to at least one of the network switches; and at least one node electronics unit that includes at least one network communication interface wherein each interface is communicatively coupled to at least one of the networks such that each CCPU is communicatively coupled to each node electronics unit through each network.

29. A centralized power distribution system in accordance with claim 28 further comprising a network switch communicatively coupled to each network to facilitate network communications.

30. A centralized power distribution system in accordance with claim 17 wherein said network is a dual redundant network that comprises:

two digital communication networks;

two CCPUs that each include at least one network communication interface wherein each interface is communicatively coupled to one of said networks; and at least one node electronics unit that comprises two network communication interfaces wherein each interface is communicatively coupled to one of the networks such that each CCPU is communicatively coupled to each node electronics unit separately through each network.

31. A centralized power distribution system in accordance with claim 28 wherein each CCPU is communicatively coupled to each switch of each other respective network such that each CCPU is able to communicate through each network through each respective switch.

32. A centralized power distribution system in accordance with claim 28 wherein each switch is communicatively coupled to each other switch of each other respective network such that each CCPU is able to communicate through each network through each respective switch.

33. A centralized power distribution system in accordance with claim 17 wherein each said CCPU is communicatively coupled to each other CCPU only through messages transmitted from each said CCPU to the node electronics units and messages received by each said CCPU from the node electronics units.

34. A centralized power distribution system in accordance with claim 17 wherein each CCPU is configured to determine a relative difference in clock speed between it and each other CCPU.

35. A power distribution system comprising:

a plurality of circuit breakers;

at least one digital network;

at least one central control processing unit; and a plurality of node electronic units, each node electronic unit being communicatively coupled to said at least one central control processing unit via said at least one digital network and each node electronic unit being communicatively coupled to an associated circuit breaker of said plurality of circuit breakers so that each node electronic unit transmits a first message to said at least one central control processing unit, wherein said at least one central control processing unit transmits a signal to each node electronic unit to ensure that said first message from all of said plurality of node electronic units represents a synchronized condition of the power distribution system.

36. A centralized power distribution system in accordance with claim 35 wherein each node electronic unit receives a second message from said at least one central control processing unit over said at least one digital network processor such that all of said associated circuit breakers are operable by said at least one central control processing unit in response to said synchronized condition.

37. A centralized power distribution system in accordance with claim 35 wherein said at least one digital networks comprises a number of networks that is equal to a number of said at least one central control processing units.

* * * * *